April 1, 1952  A. B. McLAUCHLAN  2,591,086
BERRY CLEANER
Filed June 14, 1948   3 Sheets-Sheet 1

INVENTOR.
ARTHUR B MCLAUCHLAN
BY
T. R. Geisler.
ATTORNEY

April 1, 1952   A. B. McLAUCHLAN   2,591,086
BERRY CLEANER

Filed June 14, 1948   3 Sheets-Sheet 2

INVENTOR.
ARTHUR B MCLAUCHLAN
BY
ATTORNEY

April 1, 1952  A. B. McLAUCHLAN  2,591,086
BERRY CLEANER

Filed June 14, 1948  3 Sheets-Sheet 3

INVENTOR.
ARTHUR B MC LAUCHLAN
BY
ATTORNEY

Patented Apr. 1, 1952

2,591,086

UNITED STATES PATENT OFFICE 2,591,086

BERRY CLEANER

Arthur B. McLauchlan, Salem, Oreg.

Application June 14, 1948, Serial No. 32,867

1 Claim. (Cl. 209—329)

The present invention is closely related to the invention described in my copending application, Serial No. 11,911, filed under date of February 28, 1948, and entitled "Vegetable and Fruit Washer." This application is in part a continuation of said copending application.

My previously filed application relates to the washing of vegetables and fruits. The present application relates to the removal of bits of straw and other foreign particles from berries without requiring the immersion of the berries in water, and thus without necessitating complete washing of the berries as provided for in my previously filed application.

More particularly, the present invention relates to the removal of straw and the like from strawberries immediately after the picking of the berries.

In many localities it is customary to place straw on the ground around the strawberry plants as a protection to the plants against winter weather, etc. When the berries are subsequently picked, pieces of straw and other foreign particles will more or less cling to the berries and require subsequent removal. If the berries are to be immediately hulled and then processed in any of the customary ways, the complete washing of the berries after the hulling will serve to remove such bits of straw, etc., and such washing can be very satisfactorily performed in the vegetable and fruit washer described in my above mentioned copending application, Serial No. 11,911. However, it is often desired to freeze the fresh strawberries in the more or less dry state without hulling them or otherwise processing them, especially the larger variety of strawberries, and thus the complete washing of the strawberries with the hulls on, causing the strawberries to become thoroughly soaked with water, is not desirable. On the other hand, dry, frozen unhulled and unprocessed berries are not attractive to the discriminating public if they have bits of straw or other foreign particles attached to them, giving them an untidy appearance.

The object of this invention accordingly is to provide improved means for cleaning straw, bits of leaves and other foreign particles from the berries without necessitating the immersion or complete washing of the berries.

A related object is to provide a simple, practical device in which such cleaning of the berries, and of strawberries in particular, can be accomplished quickly, easily, in large quantities and with a minimum amount of care and labor.

I have been able to attain these objects by means of the improved berry cleaner hereinafter briefly described with reference to the accompanying drawings, in which.

Figure 1:
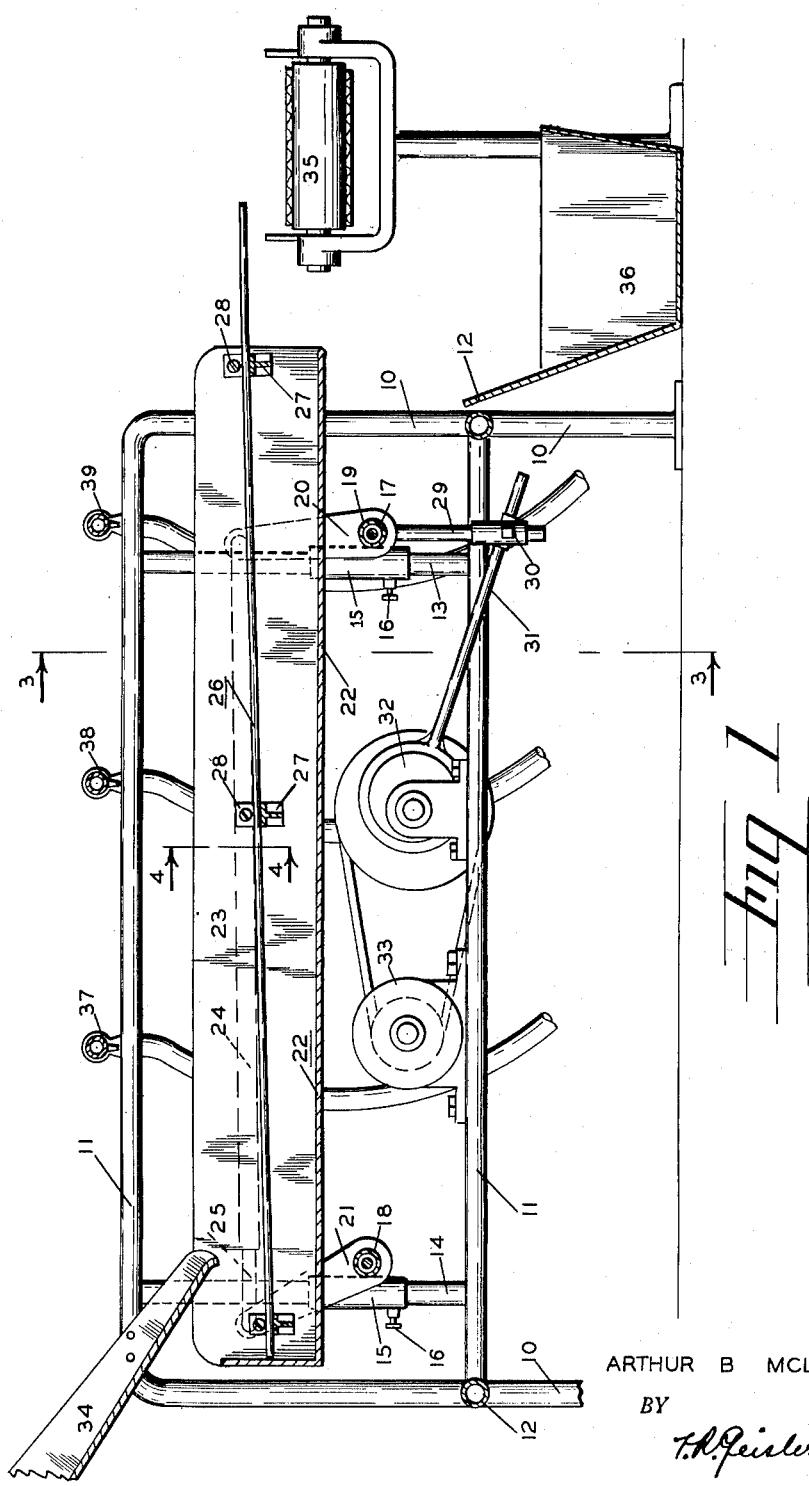
Fig. 1 is a sectional side elevation of the berry cleaner taken on the line 1—1 of Fig. 2.
Figure 2:
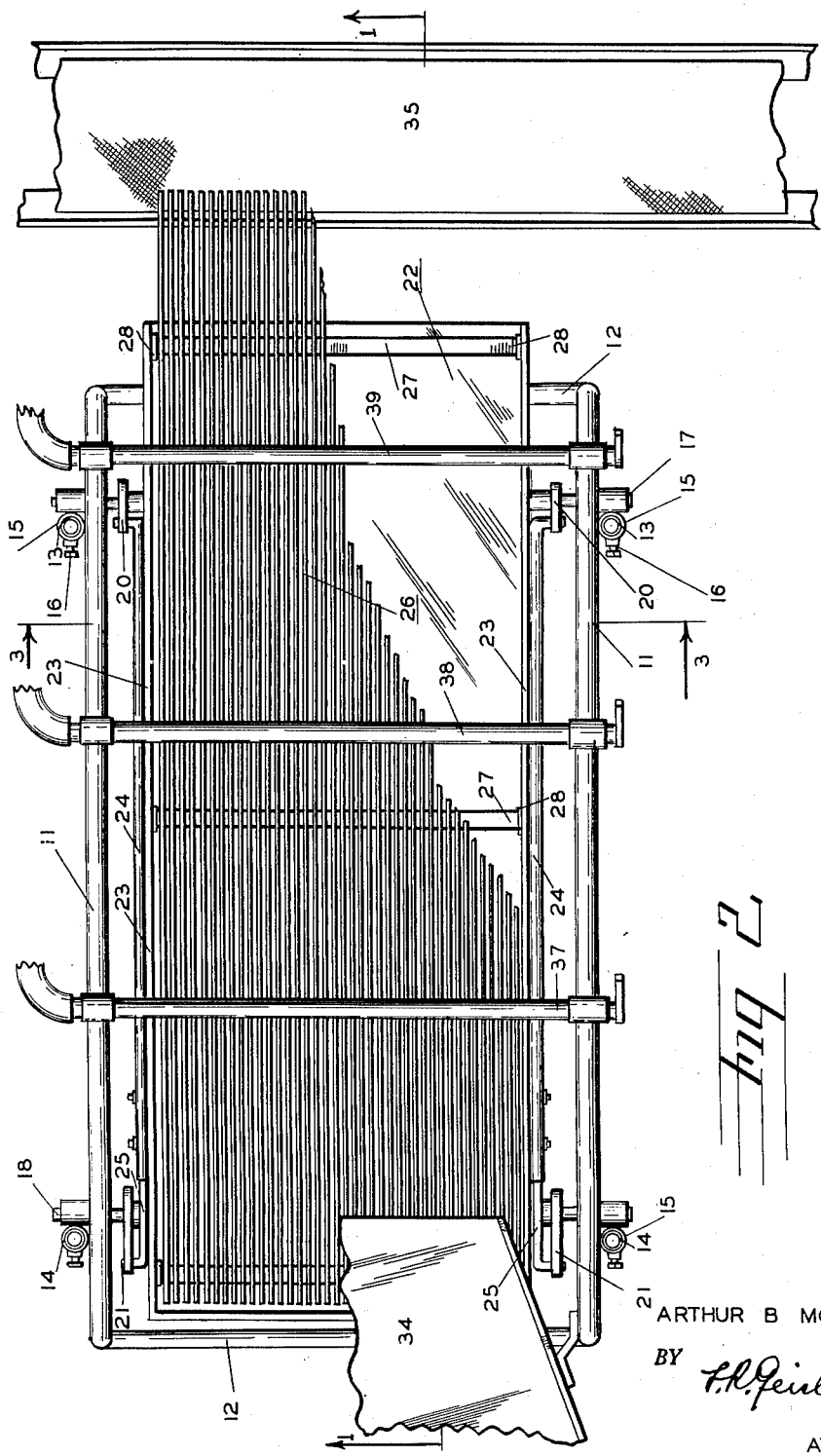
Fig. 2 is a plan view of the same.
Figure 3:
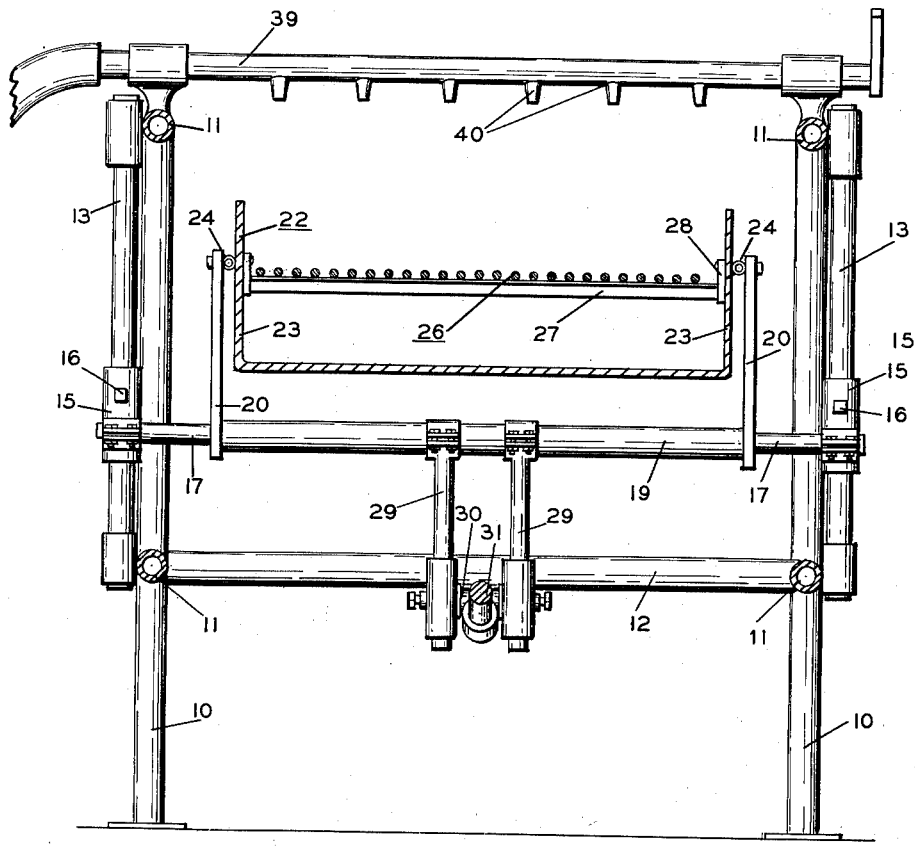
Figure 4:
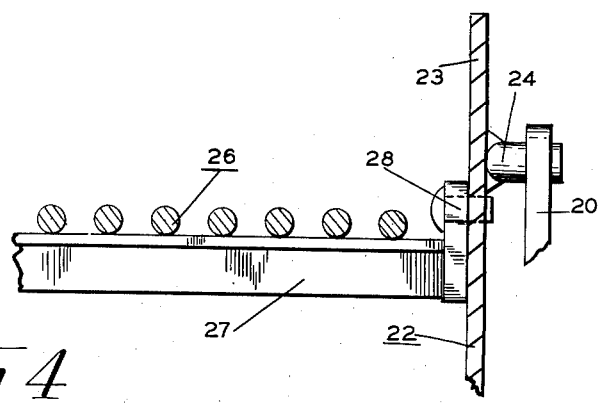

Fig. 3 is a fragmentary section taken on lines 3—3 of Figs. 1 and 2, but drawn to a slightly larger scale; and Fig. 4 is an enlarged fragmentary transverse section on line 4—4 of Fig. 1.

The device includes a rigid frame composed of four upright members or posts 10, a pair of integral longitudinal members 11, at each side, and transversely extending members 12 and suitable bracing members, all of which are welded or otherwise secured together so as to constitute an integral, rigid, supporting frame-work. A pair of vertical members 13 and 14 extend from the lower to the upper horizontal frame members 11 on each side. A bracket sleeve 15 is slidably mounted on each of the two pairs of vertical members 13 and 14. Suitable set screws 16 secure the bracket sleeves 15 in place.

A transversely extending shaft 17 has its ends secured on the bracket sleeves supported on the two forward vertical members 13, and a similar transverse shaft 18 has its ends secured on the bracket sleeves mounted on the two rear vertical members 14. A sleeve 19 is carried on the forward shaft 17 and is mounted at each end on a cylindrical bearing of rubber or similar resilient material. These resilient bearings are similar to those described in my said copending application, Serial No. 11,911, and therefore need not be described in detail here. The purpose of these resilient bearings is to enable the sleeve 19 to be given a limited oscillatory movement on the stationary shaft 17 without any actual sliding of the bearing surfaces on each other, in the manner described in my said copending application.

A pair of arms 20 are rigidly secured to the respective ends of the sleeve 19 and are located near the sides of the frame. The arms 20 extend upwardly and are parallel to each other. A similar pair of arms 21 are secured to the ends of a similar sleeve which is similarly mounted for limited oscillatory movement on the rear shaft 18, and the rear pair of arms 21 also extend upwardly and are parallel to each other but are not parallel to the forward arms 20. The rear pair of arms 21, as illustrated in Fig. 1, are inclined rearwardly from the vertical at a greater angle than the forward arms 20.

A pan, designated in its entirety by the reference character 22, having vertical side walls 23, a rear wall and a flat bottom wall, extends substantially the full length of the berry cleaner and is supported on the two pairs of arms 20 and 21. A stationary tubular section 24 of a telescoping fixture is rigidly secured on the outside of each of the side walls 23 of the pan 22. The forward arms 20 have their upper ends pivotally connected to the forward ends of these tubular sections 24 respectively. A telescoping member 25 is mounted in each tubular section 24 and the arms 21 are pivotally connected to these telescoping members 25 respectively. The telescoping members 25 are held in fixed position in the tubular sections 24 by suitable set screws.

A grating 26 is composed of a plurality of identical small, longitudinally-extending rods in parallel and equally-spaced formation. The grating rods which form the grating 26 are longer than the pan 22 and thus extend a short distance beyond the forward end of the pan, as shown in Fig. 1. The grating rods are secured by welding to supporting cross bars 27 (Fig. 4) and the ends of these cross bars 27 are welded to brackets 28 which are removably bolted to the side walls 23 of the pan 22. The equal spaces between the parallel grating rods are made large enough to permit straw and other ordinary foreign matter to drop down between the rods, but these spaces are not large enough to permit any of the berries to pass therethrough. The grating 26 is so mounted and positioned in the pan 22 that it slopes upwardly at a constant slight angle from the rear end to the forward or discharging end, as shown in Fig. 1. On the other hand the bottom of the pan 22 is horizontal, as illustrated in Fig. 1, or else is made to slope slightly downwardly from the rear to the front end and thus to slope oppositely from the grating 26.

On the sleeve 19, which is supported on the forward shaft 17, a pair of downwardly extending arms 29 (Figs. 1 and 3) are securely clamped in parallel relationship, and a knuckle joint 30 is carried near the bottom of these arms. A sleeve is mounted for limited oscillatory movement in the knuckle joint 30 and in turn is secured by suitable clamping screw (not shown) on a pitman rod 31. The preferred construction of the knuckle joint 30 and associated elements is described in detail in my copending application, Serial No. 11,911. The other end of the pitman rod 31 is secured to a bearing ring mounted on an eccentric 32 (Fig. 1) which is arranged so as to be rotated by a motor 33.

A chute 34 is placed at the intake end of the cleaner and is so mounted and sloped as to deliver the berries, which are dumped into the chute, on top of the grating 26 at the rear end of the pan 22. An endless conveyor belt 35 is mounted on suitable supports at the discharge end of the device and is placed below the forward ends of the rods constituting the grating 26.

Briefly, the cleaner operates in the following manner: When the motor 33 is turned on a rapid oscillating motion is imparted to the forward sleeve 19 and to the forward pair of arms 20, causing the arms 20 to oscillate through a small arc. The oscillation of the forward arms 20 imparts vibratory movement to the entire pan 22 and produces oscillation of the rear pair of arms 21. However, due to the fact that the rear pair of arms 21 is inclined at a greater angle from the vertical than the forward pair of arms 20, a special composite vibratory movement will be imparted to the pan 22 and thus to the grating 26 mounted in the pan. This composite oscillatory vibration, as apparent from Fig. 1, will be made up of vertical and horizontal components, and the intake end of the pan will have a greater vertical movement than the discharge end. The effect of such composite vibratory movement on objects placed on the upwardly sloping grating 26, which effect is explained at some length in my copending application Serial No. 11,911, will be to cause such objects to travel forwardly and upwardly on the grating and also to cause any elongated objects, such as pieces of straw which are free to move, gradually to arrange themselves in parallel alignment with the forward direction of movement, that is to say, parallel to the rods which compose the grating 26. But as soon as the loose pieces of straw are brought into parallelism with the grating rods these pieces of straw will drop through the grating and on to the pan bottom and eventually will drop out from the forward end of the pan bottom.

A suitable collecting vessel 36 is placed on the floor below the discharge end of the pan and thus the straw and other foreign particles and debris which have been shaken off or separated from the berries are ultimately deposited in the collecting vessel 36 for removal, while the berries themselves are finally deposited on the endless conveyor belt 35. Were it not for the special composite vibratory movement which is imparted to the grating 26, some of the pieces of straw might travel sideways along the grating and thus fail to pass through the grating and into the pan below; but with the composite vibratory movement, produced as described, all the pieces of loose straw, regardless of their length, will tend to arrange themselves parallel to the grating rods and thus will drop through the grating.

In some cases it may be desirable to subject the berries to fine sprays of water as an aid in dislodging particles of straw and the like from the surfaces of the berries. For this purpose I provide the transversely extending pipes 37, 38 and 39 (Figs. 1 and 2) above the grating and pan and at spaced distances along the longitudinal path of travel of the berries. The pipes 37, 38 and 39 are fitted with suitable spray nozzles 40 (Fig. 3) and each pipe is connected to a suitable source of water under pressure and is provided with a shut-off valve so that any pipe can be used separately. It is also possible to have the pipes connected to a source of compressed air instead of water under pressure, and in this way it is possible to subject the berries to air jets for the purpose of dislodging bits of straw, etc. It would also be possible to use the first pipe 37 for a water spray and the other pipes 38 and 39 for delivering air jets on to the berries if desired. Various arrangements are possible within the scope of my invention, and the use of sprays of water or jets of compressed air will be optional depending upon the condition of the berries.

I have found that it is not generally necessary to use either sprays of water or jets of air unless the berries are unusually dirty or have been picked while damp, inasmuch as the shaking of the berries on the grating of the cleaner will shake off loose pieces of straw and other visible particles which may have clung to the berries after they are picked, and of course any loose straw which has been gathered with the berries will require no further attention since it is automatically and quickly disposed of in my berry cleaner.

I claim:

A berry cleaner of the character described for separating straw or other elongated foreign particles from berries, comprising a pan having side walls and a bottom wall, said pan supported on two pairs of pivotally-mounted similar rocker arms located near the intake and discharge ends of said cleaner respectively, said arms mounted to swing in substantially parallel vertical planes parallel to the longitudinal center line of said pan, the arms in each pair being parallel to each other and located on opposite sides of said pan respectively, all of said arms being inclined from the vertical in similar direction but the angle of inclination from the vertical of the arms at said intake end being greater than that of the arms at said discharge end, a grating firmly mounted in said pan above said pan bottom and extending from said intake end to said discharge end, said grating sloping slightly upwardly at all times from said intake end to said discharge end and having longitudinal slots parallel to the longitudinal center line of said pan, the width of said slots being less than the minimum dimension of the berries to be cleaned but greater than the width of the straw and other elongated particles to be separated from the berries, and means for imparting a rapid oscillatory movement to said pan and arms and thus to said grating, thereby causing said grating to be oscillated simultaneously in horizontal and vertical directions with the amount of vertical oscillation being greater at the intake end than at the discharge end of said cleaner, said pairs of arms being so arranged that they will raise said pan and grating with their forward swing in the direction of said discharge end and lower said pan and grating with their return rearward swing in each cycle of oscillation and thus cause the upward slope of said grating to be momentarily slightly reduced during each forward thrust on said grating and correspondingly increased momentarily during each return rearward movement of said grating, whereby the resulting composite oscillatory vibration of said grating will cause all material when deposited on the intake end of said grating to travel upwardly forwardly on said grating and at the same time will cause straw or similar elongated foreign particles while traveling forwardly on the grating to become arranged in parallelism with said slots and so caused to drop through said slots.

ARTHUR B. McLAUCHLAN.

REFERENCES CITED

The following references are of record in the file of this patent:

UNITED STATES PATENTS

| Number | Name | Date |
| --- | --- | --- |
| 620,045 | Morley et al. | Feb. 21, 1899 |
| 757,477 | Marcus | Apr. 19, 1904 |
| 1,111,217 | Cole | Sept. 22, 1914 |
| 1,578,034 | Hoover | Mar. 23, 1926 |
| 1,703,726 | Davis | Feb. 26, 1929 |
| 1,847,309 | Schmidt | Mar. 1, 1932 |
| 1,858,917 | Davis | May 17, 1932 |
| 2,019,547 | Thebald | Nov. 5, 1935 |
| 2,079,059 | Winkleman | May 4, 1937 |
| 2,208,127 | Hallenbeck | July 16, 1940 |
| 2,290,434 | Johnson | July 21, 1942 |